US011941623B2

(12) United States Patent
Williams et al.

(10) Patent No.: US 11,941,623 B2
(45) Date of Patent: Mar. 26, 2024

(54) DEVICE MANAGER TO CONTROL DATA TRACKING ON COMPUTING DEVICES

(71) Applicant: PAYPAL, INC., San Jose, CA (US)

(72) Inventors: David Williams, Aptos, CA (US); Dmitry Martyanov, Santa Clara, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 16/452,230

(22) Filed: Jun. 25, 2019

(65) Prior Publication Data
US 2020/0410489 A1 Dec. 31, 2020

(51) Int. Cl.
*G06Q 20/40* (2012.01)
*G06Q 20/32* (2012.01)
*G06Q 20/38* (2012.01)
*G06Q 50/18* (2012.01)
*H04L 67/025* (2022.01)
*H04L 67/50* (2022.01)

(52) U.S. Cl.
CPC ......... *G06Q 20/40* (2013.01); *G06Q 20/3223* (2013.01); *G06Q 20/3829* (2013.01); *G06Q 50/188* (2013.01); *H04L 67/025* (2013.01); *H04L 67/535* (2022.05); *G06Q 2220/00* (2013.01)

(58) Field of Classification Search
CPC ............... G06Q 20/40; G06Q 20/3223; G06Q 20/3829; G06Q 50/188; G06Q 2220/00; H04L 67/025; H04L 67/22
See application file for complete search history.

(56) References Cited

U.S. PATENT DOCUMENTS 8,156,041 B2 * 4/2012 Jun .................. G06Q 40/00
705/39
8,468,271 B1 * 6/2013 Panwar ................ H04L 67/306
709/249
9,152,820 B1 * 10/2015 Pauley, Jr. .......... H04L 63/0227
(Continued)

OTHER PUBLICATIONS

K. Luttge, "E-charging API: outsource charging to a payment service provider," IEEE Intelligent Network 2001 Workshop. IN 2001 Conference Record (Cat. No. 01TH8566), 2001, pp. 216-222, doi: 10.1109/INW.2001.915316. (Year: 2001).*
(Continued)

*Primary Examiner* — David P Sharvin
*Assistant Examiner* — Steven R Chism
(74) *Attorney, Agent, or Firm* — Haynes and Boone, LLP

(57) ABSTRACT

There are provided systems and methods for a device manager to control data tracking with client devices. A device may implement a manager process or application that allows a user to set preferences and/or a schedule of rates for allowing other online service providers to track user data. This may include placement of device-side data, such as a cookie or pixel, or tracking of device data through an application. The manager process may detect when a website, online platform, application, or other entity attempts to track data on the device and may utilize the schedule of rates to request a payment from the tracking entity. If the entity agrees to the payment, the manager may allow the entity to begin tracking data. However, if the tracking entity does not agree to the payment, then the manager may prevent the tracking entity from collecting data from the device.

20 Claims, 7 Drawing Sheets

(56) References Cited

U.S. PATENT DOCUMENTS

| | | | | |
|---|---|---|---|---|
| 9,882,999 B1* | 1/2018 | Xu | ............................ | H04L 67/22 |
| 10,332,156 B2* | 6/2019 | Buchalter | ........... | G06Q 30/0241 |
| 10,581,991 B1* | 3/2020 | Wooldridge | ............ | H04L 67/20 |
| 2009/0327150 A1* | 12/2009 | Flake | ..................... | G06Q 40/00 |
| | | | | 705/80 |
| 2011/0238501 A1 | 9/2011 | Almeida | | |
| 2012/0084349 A1* | 4/2012 | Lee | .................... | G06Q 30/0251 |
| | | | | 709/203 |
| 2014/0337089 A1* | 11/2014 | Tavares | .............. | G06Q 30/0201 |
| | | | | 705/7.29 |
| 2015/0200915 A1 | 7/2015 | Yeager et al. | | |
| 2015/0302456 A1* | 10/2015 | Rego | .................. | G06Q 30/0235 |
| | | | | 705/14.35 |
| 2017/0098234 A1* | 4/2017 | Carlson | .............. | G06Q 30/0215 |
| 2017/0201779 A1 | 7/2017 | Publicover et al. | | |
| 2017/0345105 A1 | 11/2017 | Isaacson et al. | | |
| 2018/0293603 A1* | 10/2018 | Glazier | .................. | G06Q 50/01 |
| 2019/0073668 A1* | 3/2019 | Nakhuda | .............. | G06Q 40/123 |

OTHER PUBLICATIONS

T. Bujlow, V. Carela-Español, J. Solé-Pareta and P. Barlet-Ros, "A Survey on Web Tracking: Mechanisms, Implications, and Defenses," in Proceedings of the IEEE, vol. 105, No. 8, pp. 1476-1510, Aug. 2017, doi: 10.1109/JPROC.2016.2637878. (Year: 2017).*
International Appl. No. PCT/US2020/039327, International Search Report and Written Opinion dated Nov. 18, 2020, 18 pages.

* cited by examiner

DEVICE MANAGER TO CONTROL DATA TRACKING ON COMPUTING DEVICES

TECHNICAL FIELD

The present application generally relates to controlling data tracking on computing devices and more specifically to data manager applications that control placement of device-side data that allows for tracking of device usage by online entities.

BACKGROUND

Various types of service providers may provide online services to users, merchants, other entities, including usage of online platforms to interact with the service provider and other users. These service providers may request that a device insert a piece of data, such as a web cookie or a pixel, device-side so that the service provider can track device usage. For example, these data pieces may allow for tracking of a browsing history of a user using the device or other online navigations performed using the device. The data piece may therefore interact with a web browser application on the device to track device and user data. Additionally, service providers may provide native applications which may interact with other device components, such as a database, navigational component, or communication module, to similarly track user and device data. While this may provide service providers with additional data so that the service provider may target content to the device's user, this also may invade user privacy. Thus, the user may wish to control placement of device-side data and other data tracking mechanisms to control what types of data can be tracked from the user computing device.

Figure 1:
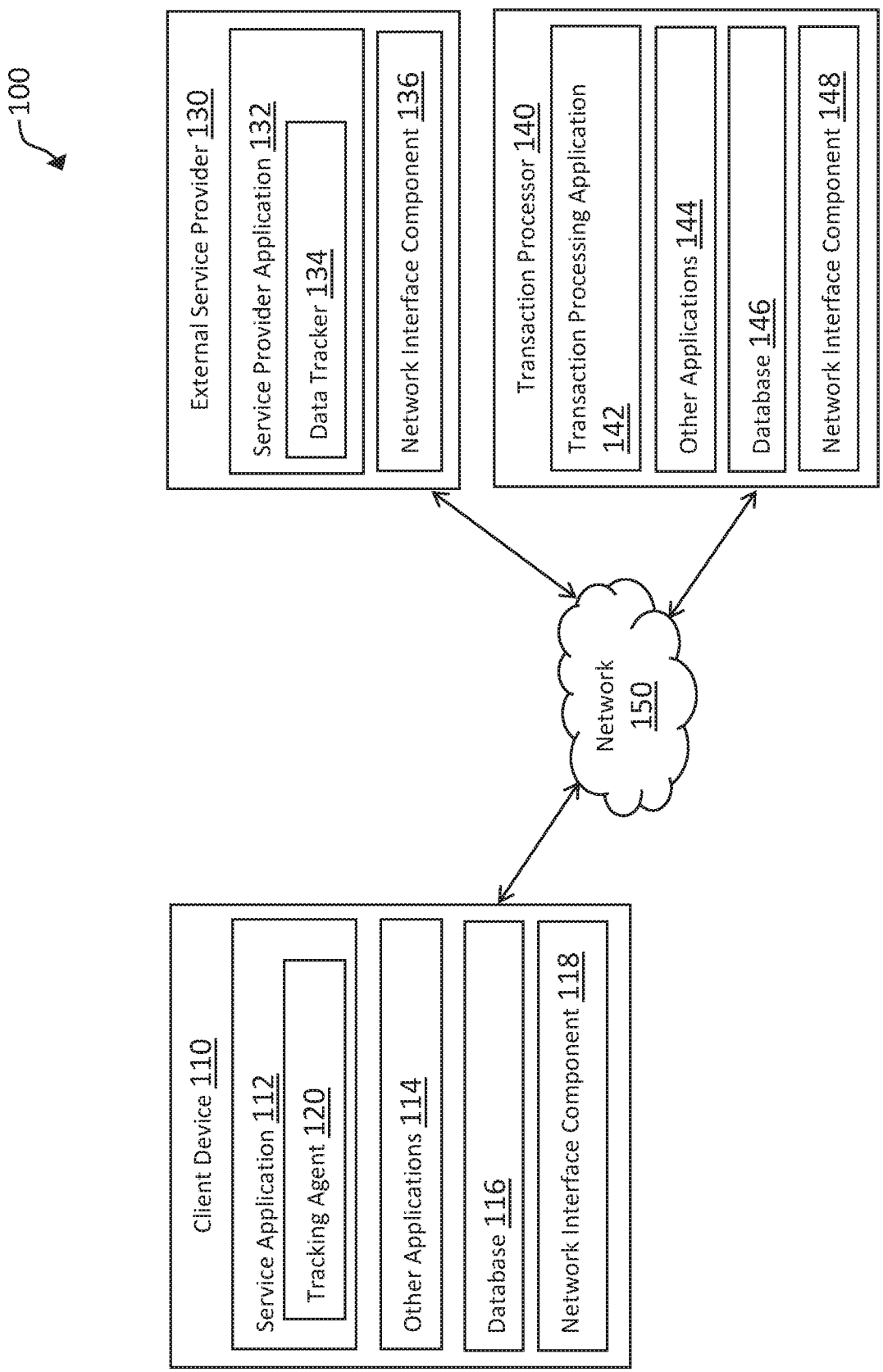
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a device manager to control data tracking with client computing devices. Systems suitable for practicing methods of the present disclosure are also provided.

A user may wish to manage data tracking by online entities, such as service providers, application providers, data aggregators, and other entities, through a device of the user, and possibly require payment for the placement of such tracking mechanisms. Data tracking may correspond to collection and aggregation of user and/or device data, including browsing histories using a web browser on the device, application usage statistics and parameters, and detected device data (e.g., device locations, wireless connections, audio/visual content such as pictures, videos, or audio recordings, and other types of data that may be detected through a device component or sensor). The data may therefore correspond to user behaviors using the device or while the device is in the user's possession. This data may be used to provide more targeted advertisements to the user and may also inform the online entity of particular interactions to better steer business decisions. The online entity may correspond to some tracking service or system that attempts to retrieve data from the user device for use in tracking user or device data. In some embodiments, this data for a collection of users, such as a population, demographic, or geographical area, may be referred to as "big data" and may be used to computationally determine patterns, trends, or associations between different people, such as behaviors and interactions that the group may have. However, this data tracking may be unwanted by users concerned with their privacy or the user may wish to receive some payment or remuneration for providing such data to these online entities, similar to participating in market research studies and focus groups. Additionally, the data may become compromised or stolen by malicious actors, which may raise privacy concerns for the user. Thus, users may wish to control data tracking through their devices by these online entities.

In order to track data, the online entity may use a piece of data that is stored and functions device-side on the user's device to track the data. In some embodiments, the piece of data may correspond to a web cookie or tracking pixel. For example, a web cookie, such as a hypertext markup language (HTML) cookie, may be placed on the device when the user navigates to a particular webpage of a website of the online entity, and may track user data by recording the user's browsing activity. These web cookies may be used to track navigations by the user, as well as input, such as form filling information. A tracking pixel, such as an HTML pixel, may correspond to a code snippet (e.g., HTML snippet) that is loaded to a user interface of the web browser when the user opens an email or visits a website. This similarly may be used to track user behavior when browsing. In other embodiments, a code snippet, executable process, or native application on the user's device (e.g., a resident dedicated application of a service provider or other online entity, such as a payment, social networking, image sharing, or other application) may track data by accessing stored data in a database or utilizing a device component, such as a GPS or other location sensor, communication module, microphone, camera, or other component.

In some embodiments, a transaction processor that provides data tracking using a data tracking manager process or application may further provide account, account management, and/or additional services, including electronic transaction processing for online transactions with merchants and service providers. For example, the transaction processor may provide payment services to an account of a user so that the user may receive payments from online entities that wish to track user data. During creation of the account, the user may be required to provide identification information to establish the account, such as personal information for a user, business or merchant information for such an entity, or other types of identification information including a name, address, and/or other information. The user may also be required to provide financial information, including payment card (e.g., credit/debit card) information, bank account information, gift card information, and/or benefits/incentives, which may be used to provide funds to the account and/or an instrument for transaction processing. The user may select an account name and/or provide authentication credentials, such as a password, personal identification number (PIN), answers to security questions, and/or other authentication information. However, not all information may be necessary in all embodiments.

The user may also establish a fee schedule or a schedule of rates and fees that are required to be paid to the user's account in order to track data on the device. Note that the fee schedule can be established at any time and does not need to be at the time of account creation. The fee schedule may correspond to one or more payment rates that are required to be paid by an online entity in order to track user and/or device data through the user's device. For example, the fee schedule may request a flat rate for placement of any device-side data for data tracking or access by an application to device data or components for data tracking. The flat fee may also be limited by an amount (e.g., data file size or transferred data amount, such as megabits transmitted to the online entity), a quality, a length of time, or specific type of data tracking (e.g., only browser data, search histories, or location data). The fee schedule may also include variable rates, which may depend on an amount of data tracking, a length of data tracking, type of data tracking, or other parameter.

The user's account may then be used by the user to process payments from online entities for tracking of user and/or device data on the user's device, as well as other electronic transaction processing. In various embodiments, a website may provide the account services, and thus may be accessed by a web browser application through the account. The application (or website) may be associated with a payment provider, such as PayPal® or other online payment provider service, which may provide payments and the other aforementioned transaction processing services on behalf of users, merchants, and other entities. In some embodiments, a dedicated application may also be utilized to access the account and perform online interactions. The service provider may also provide a web browser or other application plug-in that may function with the account to manage data tracking by online entities through the account.

Once the account is established, the user may implement the tracking agent to track user and/or device data, which may function device-side through a process, application or application plug-in/add-on. In some embodiments, the tracking agent may also be implemented through a server or cloud computing architecture of a service provider that assists in managing data tracking, which may assist in detecting instances of device data tracking by an online entity. The user may login to their account or authenticate with the plug-in/process and approve use of the tracking agent to control data tracking and negotiate a payment for data tracking based on the fee schedule for the account. For example, the tracking agent may detect an instance of placement or existence of a web cookie or a tracking pixel on the user's device, which may be used to track data. In other embodiments, the tracking agent may detect when an application wishes to access a device component to track data, access data on the device that may be conveyed to the online entity, or place other data on the device to track data through the user's device.

The tracking agent may correspond to a browser add-on or plug-in that allows the tracking agent to be implemented with a web browser application and detect behaviors of online entities, such as requests to place data device-side that may be used for data tracking. For example, the tracking agent may intercept communications from online entities that attempt to track data or use data pieces and code snippets to track data. In other embodiments, an operating system process or an application on the device may monitor operating system and application behaviors and executed processes to determine if any of those other behaviors or processes attempt to access and/or send data, utilize a component to track data, or request that the user allow for data tracking. Such a process may similarly intercept communications and data processing requests to determine if an application is attempting to monitor, track, and send user data to another entity for data accrual.

If the tracking agent detects an instance of (or a request for) data tracking, the tracking agent may initially prevent the data tracking while the payment for the data tracking is negotiated. An "instance" (also referred to herein as a "request") for data tracking may correspond to a computing process, issued by a remote or foreign device/server, to monitor data on a device. Such data monitoring may correspond to tracking of browsing history and/or data entered to a web browser using a web browser application on a client device. Additionally, such instances of data tracking may also correspond to a request to access data that is available device-side, such as data stored to a database of a client device and/or available utilizing an identifier associated with a client device. In some embodiments, instances of data tracking may also correspond to requests to utilize a device component to track data of a user, such as user locations through a location detection component and/or service or tracking of user biometrics using a sensor. Thus, an instance of data tracking may be any computing request to determine data associated with a device or user utilizing a process or application on a user device.

During the time of the detected instance or request, the tracking agent may prevent the requested data tracking, such as the placement of device-side data on the device or access by an application to data or a component associated with data tracking. This may occur substantially in real-time with the negotiation of the rate so that the use of the application and/or navigation to and use of a webpage is not impeded. However, in other embodiments, the user may be notified that the tracking agent detected the instance of (or the request for) data tracking and that the rate is attempting to be negotiated and/or activity with the webpage or application may be suspended during the negotiation and payment by the tracking agent. The tracking agent may provide a payment identifier associated with the user's account and/or fee schedule to the online entity in response to the detected tracking instance. The payment identifier may correspond to a token or identifier (e.g., alphanumeric identifier, such as a universally unique identifier (UUID)) that allows identification of the user's account, fee schedule, and/or request for payment based on the fee schedule. The payment identifier may previously be received and stored by the tracking agent for use with the request for the payment. In other embodiments, the tracking agent may make a request to a payment service provider on behalf of the application requesting the payment to send the fee schedule to the application and/or the online entity of the application.

Once the online entity receives the fee schedule, the online entity may determine whether to provide a payment to the user's account based on the fee schedule. The payment may be a flat amount or may be variable based on the requested data tracking by the entity. For example, an automated process of the online entity and/or an administrator may approve or decline payments based on fee schedules received by the online entity and/or through the application. In the event that payment is approved, the online entity may process a payment with the account service provider, transaction processor, or other online payment provider. This may include electronic transaction processing to provide a payment for the agreed upon fee to an account of the user (e.g., from an account of the online entity) using the payment provider. In response to processing the payment, the payment provider may provide the online entity with a transaction identifier, such as a receipt or transaction confirmation code/identifier. The online entity may provide this transaction identifier to the user's device, which may confirm and verify the identifier with the payment provider. Once verified, the user's device may allow the requested data tracking based on the payment provided by the online entity. In other embodiments, the application or the entity may complete a payment through the application, which may receive a transaction identifier, such as a receipt, transaction history, or code confirming payment. The application may then confirm the payment using the transaction identifier with the operating system process or application that controls data tracking, which may then allow the requested type of data tracking.

However, if the entity refuses payment, then the tracking agent may prevent the requested type of data tracking by the application and/or online entity. For example, application features may be disabled, or a webpage may be refused placement of a cookie or tracking pixel. The tracking agent may continue to monitor the application and/or online entity to prevent further data tracking and/or request payment if further data tracking is requested. Additionally, if the data tracking has been allowed by the tracking agent based on a fee negotiated and provided by the tracking agent, the tracking agent may continue to monitor whether the data tracking by the online entity (e.g., through the webpage, placed data, and/or application) is within the bounds of that negotiated by the payment. For example, the payment may limit the data tracking to an amount, a duration, a certain time period during the day, month, or year, a specific website or application, or a type of data. If the online entity attempts to breach those parameters or limitations, or otherwise conducts data tracking outside of these bounds, the tracking agent may prevent the additional data tracking, notify the user, report the online entity to an authority or administrator, and/or request additional payment for the further data tracking.

Moreover, once the limitation for data tracking expires, the tracking agent may end the data tracking and/or prevent further data tracking by the online entity. The online entity may then be required to provide further payment to track additional data. This may be processed as discussed above, where the online entity may receive the fee schedule and further negotiate a payment for the amount of data tracking requested by the online entity. The user may be informed of the ending of the data tracking, as well as further payments and/or denials of payments by the online entity. This allows the user to confirm whether the online entity has been authorized for data tracking through the user's device.

In this manner, a tracking agent implemented with a client device of a user may provide increased privacy and security of user and device data. The tracking agent may automate processes for placement of tracking data and/or use of device data/components by tracking systems without requiring user input and/or navigation to particular processes for transaction processing. This reduces the amount of required data processing by the user and device and assists in securing device-side data and components from malicious actors that may misappropriate data. Moreover, the user is able to receive benefits from allowing data tracking, which increases user's opt-in likelihood for data tracking so that online entities are able to receive user and/or device data where previous users may have refused the data tracking.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110, an external service provider 130, and a transaction processor 140 in communication over a network 150. Client device 110 may be utilized by a user to access the various features available for client device 110, which may include processes and/or applications associated with transaction processor 140 to monitor and control data tracking by external service provider 130 on client device 110 and require a payment for the data tracking. Thus, external service provider 130 may request data tracking on client device 110 using a data code, snippet, or process. Client device 110 may prevent the data tracking until a payment is made to an account associated with client device 110 based on a fee schedule for the data tracking with transaction processor 140. The payment may be processed to the account using transaction processor 140. Client device 110 may allow the data tracking within limitations established by the fee schedule.

Client device 110, external service provider 130, and transaction processor 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with external service provider 130 and/or transaction processor 140. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Client device 110 of FIG. 1 contains a service application 112, a tracking agent 120, other applications 114, a database 116, and a network interface component 118. Service application 112, tracking agent 120, and other applications 114 may correspond to executable processes, procedures, and/or applications with associated hardware. In other embodiments, client device 110 may include additional or different modules having specialized hardware and/or software as required.

Service application 112 may correspond to one or more processes to execute modules and associated devices of client device 110 to interact with a service provider or other online entity that may wish to track user and/or device data on client device 110 through service applications. In this regard, service application 112 may correspond to specialized hardware and/or software utilized by client device 110 to receive requests for data tracking on client device 110, which may be controlled by tracking agent 120. Service application 112 and/or tracking agent 120 may be used to access an account and approve control and negotiation of data tracking by tracking agent 120. The account may correspond to an account of a user associated with client device 110 that is provided and maintained by transaction processor 140. The login may be performed by service application 112 or tracking agent 120 with transaction processor 140.

Once logged in to the account, service application 112 may be used to generate the fee schedule and approve tracking agent 120 to control data tracking on client device 110 by external service provider 130 and other online entities. Service application 112 may be used to perform actions and/or interactions with external service provider 130, including browsing data and navigating between data, as well as processing electronic transactions and performing other data processing operations. Service application 112 may correspond to a general browser application configured to retrieve, present, and communicate information over the Internet (e.g., utilize resources on the World Wide Web) or a private network. For example, service application 112 may provide a web browser, which may send and receive information over network 150, including retrieving website information, presenting the website information to the user, and/or communicating information to the website. However, in other embodiments, service application 112 may include a dedicated application of transaction processor 140 or other entity (e.g., payment provider, etc.), which may be configured to provide services through the application.

Service application 112 may generate interaction data with external service provider 130 that indicates a request to track data on client device 110, which may be used by tracking agent 120 to determine whether a payment identifier for the user's account, payment request for data tracking, and/or fee schedule should be sent to external service provider 130. Service application 112 and/or tracking agent 120 may transmit the payment identifier to external service provider 130 for processing. Service application 112 may display requests to track data, data tracking events or indications, and/or the results from payments through one or more interfaces. Additionally, service application 112 may display messages warning of data tracking, how much or the type of data tracking, and/or application operation pauses based on negotiating a fee for data tracking. In some embodiments, the interaction data may correspond to tracked data, including browsing histories, application usage information, detected data using a sensor or component of client device 110, purchases, transfers, and/or electronic transaction processing, which may be with external service provider 130. During processing of a payment or transfer transaction, service application 112 and/or tracking agent 120 may be utilized to select an account to receive a payment. Service application 112 and/or tracking agent 120 may be used to redirect the user and/or display a notification if the data tracking is not allowed. Service application 112 may be utilized to view the results of payment, for example, using transaction histories, dispute resolution processes, and other post-transaction process.

Tracking agent 120 may correspond to one or more processes to execute modules and associated devices of client device 110 to receive delegated use information for a delegated use of one or more accounts, provide processes to securely log one or more applications, such as service application 112, into an account with delegated use, and monitor use of the account for enforcement of limitations on account use. In this regard, service application 112 may correspond to specialized hardware and/or software utilized by client device 110 to detect an instance of data tracking by external service provider 130 through service application 112, such as a placement of a web cookie or tracking pixel or a use of an application to retrieve stored data or track data through an application process or device component. In response, tracking agent 120 may limit or prevent the data tracking. Tracking agent 120 may send a payment identifier that identifies an account or fee schedule for external service provider 130 to use to provide a payment for fee tracking. In other embodiments, tracking agent 120 may instead transmit a request to transaction processor 140 to transmit the fee schedule to service application 112 for processing and approval of a payment through external service provider 130 (e.g., the online entity associated with and/or maintaining service application 112).

In response to receiving or accessing the fee schedule, a payment may be made by external service provider 130 to the account of the user. Tracking agent 120 may receive confirmation of the payment, and may verify the confirmation with transaction processor 140, for example, by comparing a code or validating the code with transaction processor 140. Once verified, tracking agent 120 may allow the data tracking and may monitor the data tracking to ensure that the data tracking complies with the payment and fee schedule. If not or on expiration of the amount/type/length of data tracking, tracking agent 120 may end the data tracking by external service provider 130 and request an additional payment. Moreover, if no payment is negotiated and agreed upon, tracking agent 120 may ban or disallow the data tracking. Thus, tracking agent 120 may operate to intercept data from service application 112. Further, tracking agent may redirect service application 112 on client device 110 if necessary to prevent data tracking, for example, by navigating away from a particular webpage.

In various embodiments, client device 110 includes other applications 114 as may be desired in particular embodiments to provide features to client device 110. For example, other applications 114 may include security applications for implementing client-side security features, programmatic client applications for interfacing with appropriate application programming interfaces (APIs) over network 150, or other types of applications. Other applications 114 may also include communication applications, such as email, texting, voice, social networking, and IM applications that allow a user to send and receive emails, calls, texts, and other notifications through network 150. Other applications 114 may also include other media viewing applications to consume media content on client device 110. Other applications 114 may be utilized with tracking agent 120 to detect data tracking instances, which may be controlled by tracking agent 120 as discussed herein. Other applications 114 may include device interfaces and other display modules that may receive input and/or output information. For example, other applications 114 may contain software programs, executable by a processor, including a graphical user interface (GUI) configured to provide an interface to the user.

Client device 110 may further include database 116 stored in a transitory and/or non-transitory memory of client device 110, which may store various applications and data and be utilized during execution of various modules of client device 110. Database 116 may include tracking instances and/or requests that are detected by tracking agent 120 during use of service application 112. Additionally, data tracking processes and operations, such as cookies or code snippets, may be stored in database 116 with tracked user and/or device data when they are permitted by tracking agent 120. In some embodiments, database 116 may be local to client device 110. However, in other embodiments, database 116 may be external to client device 110 and accessible by client device 110, including cloud storage systems and/or databases that are accessible over network 150.

Client device 110 includes at least one network interface component 118 adapted to communicate with external service provider 130 and/or transaction processor 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

External service provider 130 may correspond to an online platform where a user may utilize client device 110 to engage in one or more actions or interactions through an application, such as a web browser application or a dedicated service provider application provided by external service provider 130. For example, external service provider 130 may correspond to an online platform to engage in browsing data, providing user input, and/or navigating between webpages or provided interface data. In this regard, external service provider 130 may correspond to a search engine, email or messaging account provider, social network, microblogging platform, media playback, merchant or payment platform used to purchase one or more items, messaging board, or other platform that may wish to track user data through a web cookie, tracking pixel, or operation of an application/process on client device 110. Although external service provider 130 is shown as separate from transaction processor 140, the two may be combined in some embodiments. Although a single service provider or other online entity is shown, a plurality of online entities may function similarly to track user and/or device data.

External service provider 130 of FIG. 1 contains a service provider application 132 having a data tracker 134 and a network interface component 136. Service provider application 132 may correspond to executable processes, procedures, and/or applications with associated hardware. In other embodiments, external service provider 130 may include additional or different modules having specialized hardware and/or software as required.

Service provider application 132 may correspond to one or more processes to execute software modules and associated specialized hardware of external service provider 130 to provide services to users, for example, when users utilize an application to interact with one or more services. These services may include a search engine, email or messaging, social networking, microblogging, media playback, shopping or purchasing, or other service. In some embodiments, service provider application 132 may correspond to specialized hardware and/or software to track during and/or after use of service provider application 132, such as data tracked through client device 110 using data tracker 134. Service provider application 132 may be accessed through a device-side application or another application or a device/server.

In this regard, the other application and/or service provider application 132 may provide data for services and transmit a request for tracking data, such as a placement request for a cookie or tracking pixel or a request to access device-side data or components. This may correspond to a detected instance of data tracking on client device 110. The request for data tracking may be transmitted by data tracker 134 through service provider application 132, where data tracker 134 corresponds to a process and/or operation to track user data through client devices. In response to the request, service provider application 132 may receive a payment identifier, which may be used to request a fee schedule for data tracking on client device 110 from transaction processor 140. In other embodiments, service provider application 132 may directly receive the fee schedule from client device 110 through service application 112. Data tracker 134 may then determine whether the payment is authorized based on parameters or preferences set for payments, such as fees caps or authorized fee arrangements. If authorized, data tracker 134 may process a payment to an account of the user associated with client device 110 using the fee schedule and an account or payment instrument of external service provider 130. Thereafter, data tracker 134 may receive a payment or transaction confirmation message with an identifier or code permitting data tracking. Data tracker 134 may transmit the code to client device 110, which may validate the code and allow data tracking. Data tracker 134 may track data within the allowed parameters for the payment. Once expired or if data tracker 134 attempts to collect unauthorized data, data tracker 134 may be refused data tracking and/or required to further pay for the data tracking. However, if a fee is not accepted by external service provider 130, then the payment may be denied, and no data tracking may occur by data tracker 134

External service provider 130 includes at least one network interface component 136 adapted to communicate with client device 110 and/or transaction processor 140. In various embodiments, network interface component 136 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor 140 may be maintained, for example, by an online service provider, which may provide online transaction processing services for payment of data tracking services on client device 110, as well as manage payment accounts used to send and receive payments. In this regard, transaction processor 140 includes one or more processing applications which may be configured to interact with client device 110 and/or external service provider 130 to facilitate transaction processing for purchase of data tracking capabilities on client device 110. In one example, transaction processor 140 may be provided by PAYPAL®, Inc. of San Jose, Calif., USA. However, in other embodiments, transaction processor 140 may be maintained by or include another type of service provider, which may provide payment services to a plurality of users.

Transaction processor 140 of FIG. 1 contains a transaction processing application 142, other applications 144, a database 146, and a network interface component 148. Transaction processing application 142 and other applications 144 may correspond to executable processes, procedures, and/or applications with associated hardware. In other embodiments, transaction processor 140 may include additional or different modules having specialized hardware and/or software as required.

Transaction processing application 142 may correspond to one or more processes to execute modules and associated specialized hardware of transaction processor 140 to process transactions to accounts to provide payment for data tracking on client devices, such as a payment to an account associated with client device 110 to allow external service provider 130 to track data on client device 110. In this regard, transaction processing application 142 may correspond to specialized hardware and/or software used by a user associated with client device 110 to establish a payment account, which may be used to process transactions and establish a fee schedule to allow data tracking on client device 110 based on a payment to the account. In order to establish a payment account for a user associated with client device 110 to send and receive payments, the user may provide information, including user personal and/or financial information to transaction processing application 142. Additionally, the information may include authentication information, such as a login, account name, password, PIN, or other account creation information. The user may provide a name, address, social security number, or other personal information necessary to establish an account and/or effectuate payments.

Transaction processing application 142 may further allow the user to maintain the payment account, for example, by adding and removing payment instruments. The user may also provide a fee schedule for the account, which allows data tracking on client device 110 based on a payment made to the user's account. The fee schedule may include flat or variable rates for data tracking, which may be limited or made variable based on an amount, type, length, or other parameter. Additionally, once the fee schedule is established, a payment identifier for the account and/or fee schedule may be provided to client device 110 and/or the fee schedule may be provided to an application of external service provider 130 for negotiating and providing a payment.

Transaction processing application 142 may then receive the payment identifier and/or request for the fee schedule from external service provider 130 and/or the application. Transaction processing application 142 may respond with the fee schedule. If a payment is approved, transaction processing application 142 may be used to process a payment for the agreed upon rate or fee for data tracking. In order to perform transaction processing and/or payments, transaction processing application 142 may process the data for the corresponding payment and accounts. Transaction processing application 142 may generate a payment instruction and process the payment instruction to provide a payment to the account of the user from the account or payment instrument of external service provider 130. Transaction processing application 142 may therefore be used to debit an account of the user and provide the payment to an account of the merchant or other user. Transaction processing application 142 may also be used to provide transaction histories for processed transactions to client device 110 and/or external service provider 130 for confirmation and validation of the payment.

In various embodiments, transaction processor 140 includes other applications 144 as may be desired in particular embodiments to provide features to transaction processor 140. For example, other applications 144 may include security applications for implementing server-side security features, programmatic client applications for interfacing with appropriate application programming interfaces (APIs) over network 150, or other types of applications. Other applications 144 may include server interface applications for an online server platform that outputs data to one or more devices. For example, other applications 144 may contain software programs, executable by a processor, including a graphical user interface (GUI) configured to provide interface data for display on devices.

Transaction processor 140 may further include database 146 stored in a transitory and/or non-transitory memory of transaction processor 140. In various embodiments, database 146 may include account information and fee schedules, as well as identifiers used in providing and confirming payments for data tracking. For example, database 146 may be utilized to transmit a fee schedule to external service provider 130 for use negotiating a rate for data tracking. Additionally, database 146 may store authentication and payment information and other data necessary to perform a login of an account and utilize the account. In some embodiments, database 146 may be local to transaction processor 140. However, in other embodiments, database 146 may be external to transaction processor 140 and accessible by transaction processor 140, including cloud storage systems and/or databases that are accessible over network 150.

Transaction processor 140 includes at least one network interface component 148 adapted to communicate with client device 110 and/or external service provider 130 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
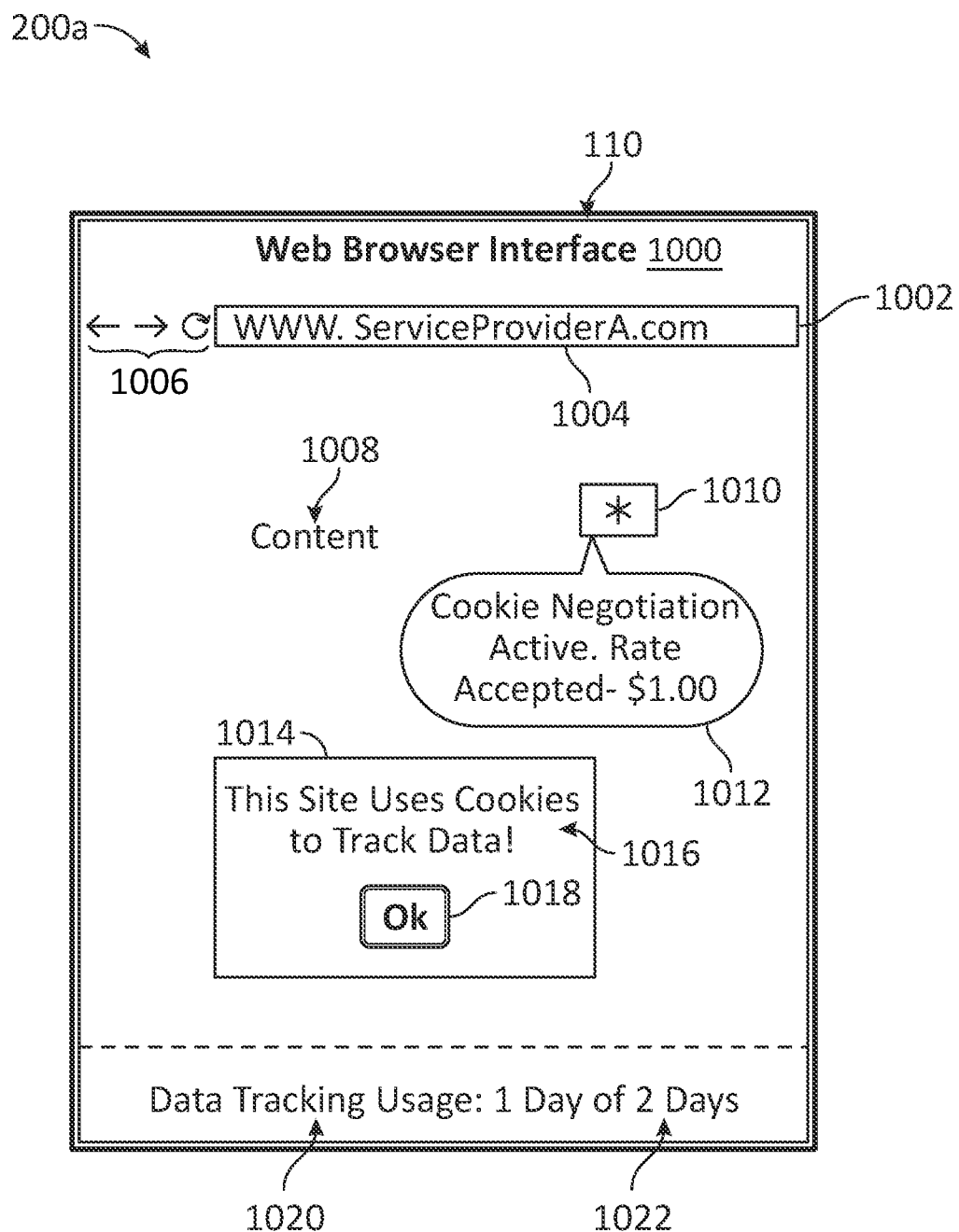
FIG. 2A is an exemplary application interface for a web browser application that controls data tracking through web browser cookies or pixels, according to an embodiment.

FIG. 2A is an exemplary application interface for a web browser application that controls data tracking through web browser cookies or pixels, according to an embodiment. Environment 200a of FIG. 2A includes client device 110 discussed in reference to system 100 of FIG. 1. Client device 110 includes a web browser interface 1000 that may be displayed by client device 110 using one or more of the applications and/or operations discussed in reference to system 100. Thus, web browser interface 1000 may be provided by a device application on client device 110.

In environment 200a, web browser interface 1000 displays a webpage that may be accessed by client device 110, where the webpage requests data tracking by placing a web cookie or tracking pixel, such as an HTML cookie or pixel, on client device 110. For example, a user may use client device 110 to navigate to a webpage address 1002 through a navigation bar 1004 and/or navigation tools 1006. The webpage corresponding to webpage address 1002 may correspond to a webpage that requests placement of device-side data used to track user navigations, application usage, device usage, or other detectable user and/or device data. The device-side data may therefore correspond to a data tracking mechanism that stores and/or transmits data to an online entity associated with the webpage. The tracked data may be generated based on interactions with content 1008, navigations using navigation bar 1004 and/or navigation tools 1006, or may correspond to other trackable data.

In response to detection of the webpage request to track user data, web browser interface 1000 may be populated with an alert icon 1010 and an alert message 1012. Alert icon 1010 with alert message 1012 serve to notify the user that the webpage is attempting to track data. For example, a toolbar icon for alert icon 1010 may appear, change color, or otherwise signify that a tracking event has been detected. Alert message 1012 may further notify the user that the tracking event has been detected, and further that a tracking agent is controlling data tracking based on a fee schedule set by the user. For example, alert icon 1010 and alert message 1012 may populate based on the detection of the data tracking event and/or population of message 1014 that notifies the user that the webpage uses data tracking through web cookies. For example, message 1014 includes content 1016 that states "This site uses cookies to track data!" Message 1014 may be populated by the webpage or based on a tracking agent detecting the instance of data tracking.

For example, alert message 1012 includes content stating: "Cookie negotiation active! Rate accepted—$1.00." This message notifies the user that a negotiation has occurred between the webpage's service provider or online entity based on a fee schedule set by the user with an account. This may be done without user input so that the payment automatically occurs if the online entity accepts one or more of the rates for the fee schedule. Additionally, in order to populate alert icon 1010 and alert message 1012, the user may be initially required to login and activate the tracking agent, for example, by selecting an add-on or plug-in and/or corresponding icon and activating the tracking agent (including authenticating an account with the web browsing add-in). Once data tracking protection and fee negotiation is active, the tracking agent may prevent data tracking until and unless the payment is authorized and paid to the user's account. Once the data tracking event is detected by the tracking agent, the tracking agent may transmit a payment identifier to the webpage, which allows for negotiation of, and agreement to, a payment for the data tracking.

The tracking agent may receive back a payment confirmation identifier, which may be used to verify that payment was completed with the payment provider processing the payment. Thus, if the payment is completed, the tracking agent may allow the user to select approval option 1018 to engage in data tracking. In other embodiments, approval option 1018 may be automatically selected. Once data tracking is active, web browser interface 1000 may also provide a portion of the interface, such as a tool bar, that monitors data tracking usage 1020. Data tracking usage 1020 shows an amount of tracked data by the webpage's tracking mechanism so that limits are adhered to and may display tracked data amount 1022 to the user.

Figure 2B:
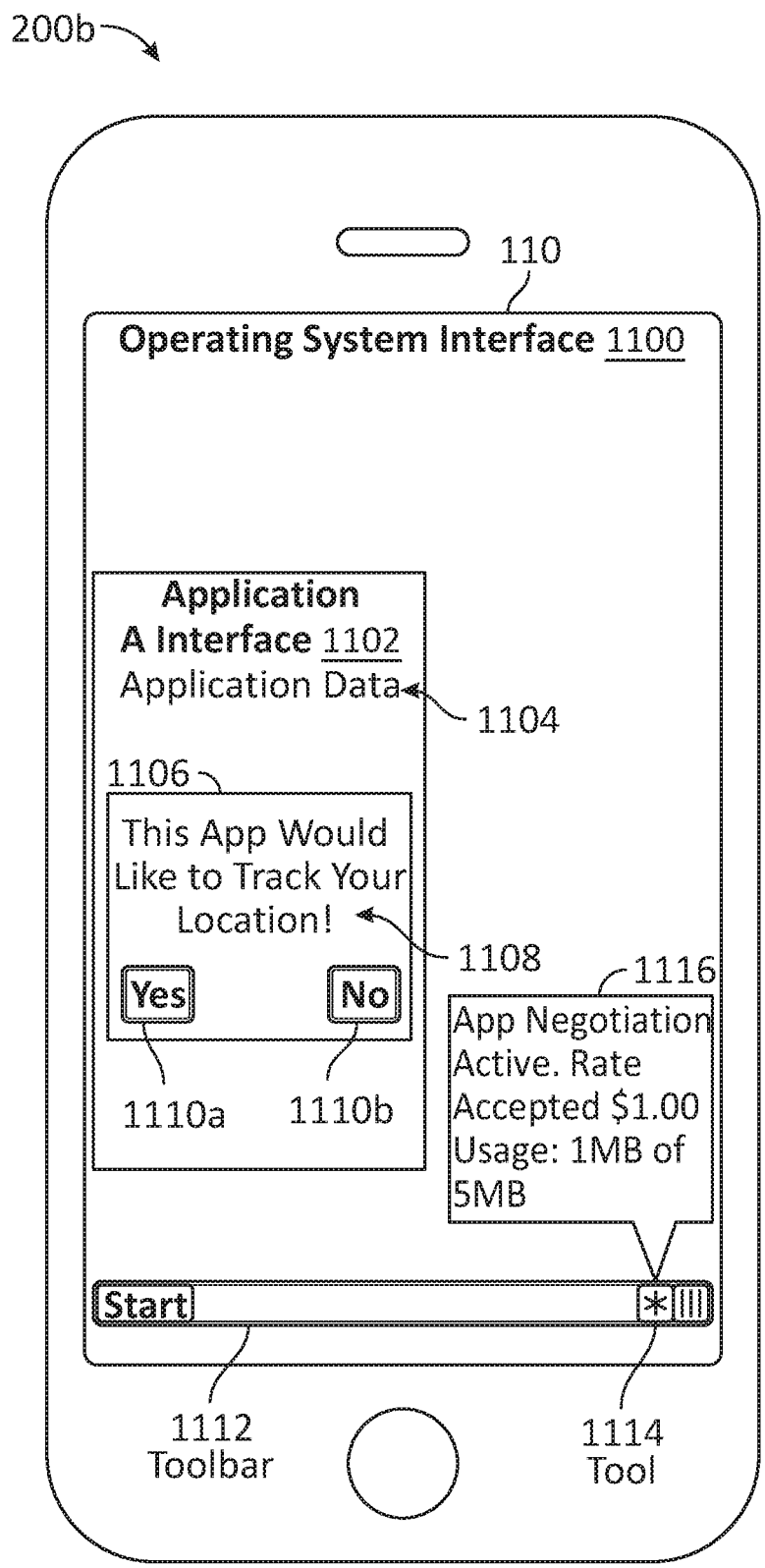
FIG. 2B is an exemplary application interface for a device application or process that controls data tracking through native device applications, according to an embodiment.

FIG. 2B is an exemplary application interface for a device application or process that controls data tracking through native device applications, according to an embodiment. Environment 200b of FIG. 2B includes client device 110 discussed in reference to system 100 of FIG. 1. Client device 110 includes an operating system interface 1100 that may be displayed by client device 110 using one or more of the applications and/or operations discussed in reference to system 100. Thus, operating system interface 1100 may be provided by an operating system in conjunction with one or more applications on client device 110.

In environment 200b, operating system interface 1100 includes an executing application that outputs an application A interface 1102. Application A may correspond to service application 112 of client device 110 in system 100. Application A interface 1102 is displayed during use of an application A based on processed data and executed actions with the application. In this regard, application A further outputs application data 1104 through application A interface 1102. Application data 1104 may be output based on user interactions with application A, including activating or opening the application and/or navigation to a particular interface or process. During use of application A and/or depending on application data 1104, a notification 1106 may populate to indicate that application A would like to track a user's location through a location detection component of client device 110 through notification content 1108. Notification 1106 may populate with notification content 1108 based on a tracking agent on client device 110 that detects that application A is attempting to access location-based services and/or location detection on client device 110. In other embodiments, application A may directly provide notification 1106 based on an intent to track location data or other device data. Notification 1106 may also be displayed with an acceptance option 1110a or a decline option 1110b to either accept or decline (respectively) location-based data tracking. Thus, acceptance option 1110a or decline option 1110b may be selected and/or authorized further by the tracking agent (e.g., tracking agent 120) without requiring user input to select one of acceptance option 1110a or decline option 1110b.

For example, the tracking agent may display a toolbar icon 1114 in a toolbar 1112 to notify the user that the tracking agent is active and monitoring/controlling data tracking on client device 110. The tracking agent may be logged into through an account and activated to use a fee schedule for the account. After activation, the tracking agent may monitor for tracking events by applications, such as application A, and provide a fee schedule for the application to process a payment to the account of the user. For example, based on notification 1106, the tracking agent may provide application A with a payment identifier and/or fee schedule, which may be used to process a payment to the user's account. If the payment is completed, a payment confirmation identifier, such as a transaction history or verification code, may be provided to the tracking agent by the application. The tracking agent may verify this identifier with the payment provider that processed the payment, and may display a payment confirmation message 1116 from toolbar 1112, which displays the amount paid to the user's account and the amount of tracked data. For example, payment confirmation message 1116 states: "App negotiation active! Rate accepted—$1.00. Usage: 1 MB of 5 MB." This allows the user to verify that a payment has been made and option 1110 may be authorized to allow for data tracking.

Figure 2C:
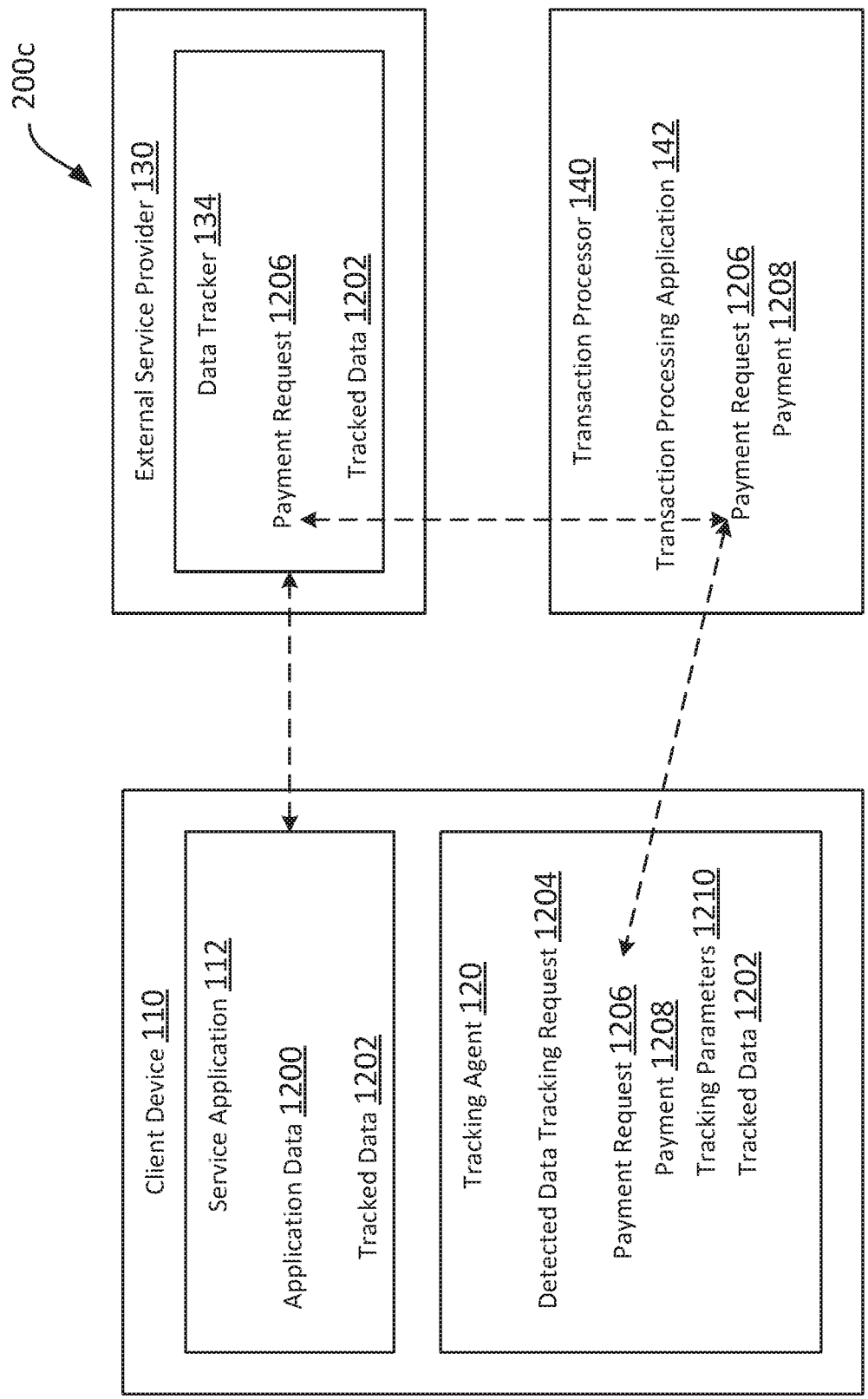
FIG. 2C is an exemplary system environment where a device manages data tracking with an online service provider, according to an embodiment.

FIG. 2C is an exemplary system environment where a device manages data tracking with an online service provider, according to an embodiment. Environment 200c of FIG. 2C includes client device 110, external service provider 130, and transaction processor 140 discussed in reference to system 100 of FIG. 1.

In this regard, client device 110 may utilize service application 112 to interact with external service provider 130, for example, by navigation to a webpage, through a website, requesting application data, and/or processing data with external service provider 130. In response to interactions with external service provider 130, external service provider 130 may attempt to track data on client device 110. In this regard, external service provider 130 may attempt to place a device-side cookie or tracking pixel on client device 110 or may attempt to access data and/or device components of client device 110. This may include tracking of application data 1200, which may be of value to external service provider 130 for business reasons. Thus, tracking agent 120 receives a detected data tracking request 1204 during operation of client device 110. In response to this, tracking agent 120 interacts with service application 112 to provide either a fee schedule for payment of a fee to allow data tracking directly to the application, and thus external service provider 130, or provide a payment identifier allowing retrieval of the fee schedule from transaction processor 140, where the payment identifier identifies the account and/or fee schedule. Tracking agent 120 may further pause or prevent data tracking of application data 1200 while payment is being negotiated.

Thus, a payment request 1206 may be transmitted to external service provider 130 based on the fee schedule and/or payment identifier. Payment request 1206 may request that external service provider 130 provide a payment for detected data tracking request 1204. Data tracker 134 of external service provider 130 may process payment request 1206 with transaction processor 140. For example, transaction processor 140 may utilize transaction processing application 142 to process payment request 1206 to provide a payment 1208 to an account of the user. Once payment 1208 is processed a confirmation of payment 1208 may be provided back to external service provider 130, which may utilize the confirmation to authorize detected data tracking request 1204 and retrieve tracked data 1202. For example, data tracker 134 may provide the confirmation of payment 1208 back to tracking agent 120, which may utilize the confirmation to authorize detected data tracking request 1204. Thereafter, tracking agent 120 may allow data tracker 134 to receive tracked data 1202 from application data 1200. Additionally, tracking agent 120 may monitor tracking parameters 1210 of tracked data 1202 so that enforcement of the rules and limitations of data tracking are adhered to by data tracker 134 of external service provider 130.

Figure 3:
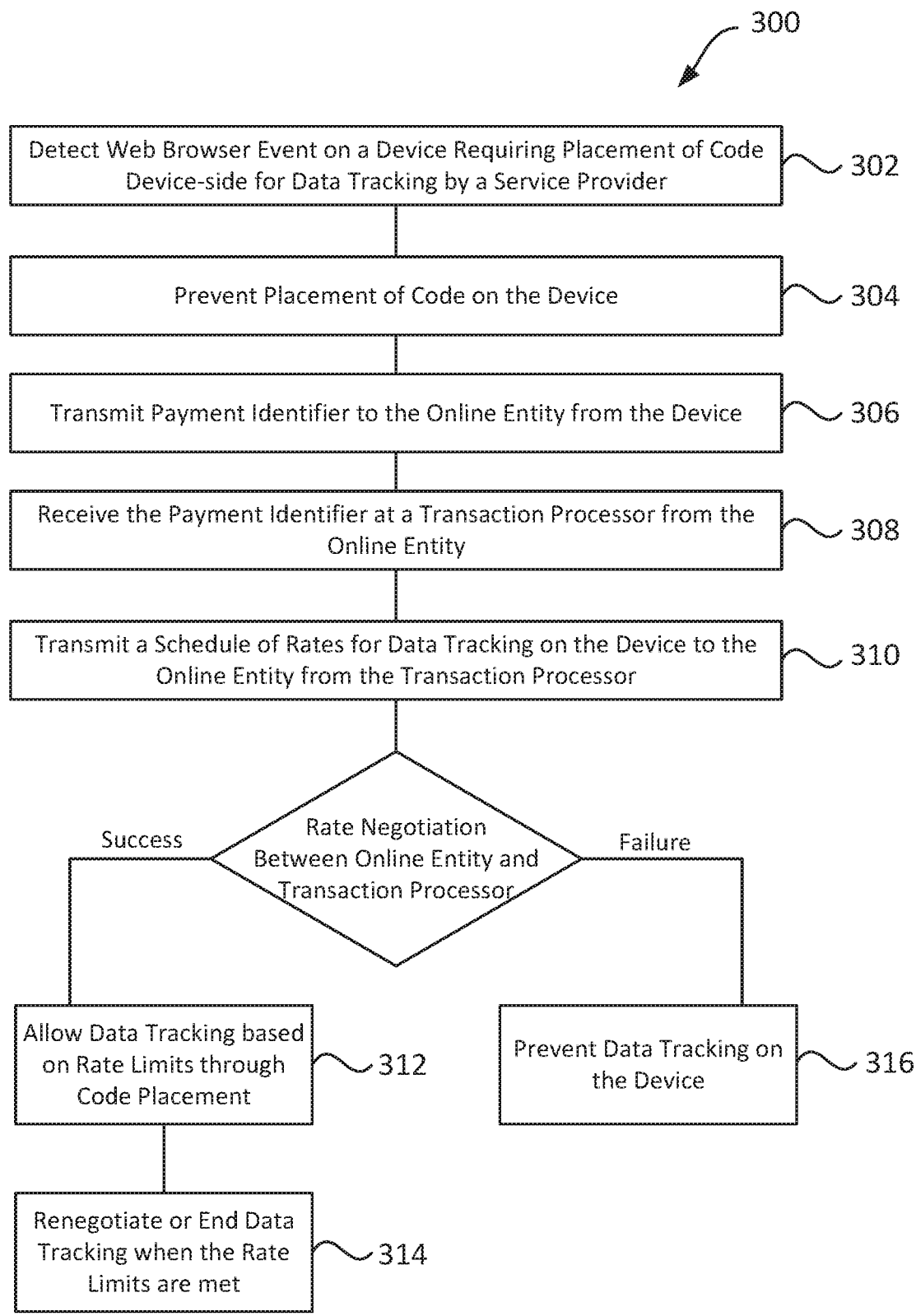
FIG. 3 is a flowchart of an exemplary flowchart for a process for managing data tracking through a web browser application, according to an embodiment.

FIG. 3 is a flowchart of an exemplary flowchart for a process for managing data tracking through a web browser application, according to an embodiment. Note that one or more steps, processes, and methods described herein of flowchart 300 may be omitted, performed in a different sequence, or combined as desired or appropriate.

Flowchart 300 begins with step 302 where a web browser event is detected, where the web browser event requires placement of code device-side for data tracking by a service provider. For example, service application 112 may correspond to a web browser application on client device 110, which may be used to navigate to a webpage of external service provider 130 that requests placement of a web cookie on client device 110. Thus, this may include a request (e.g., an indication or data tracking request for implementation of device-side code for data tracking) or attempt to place a web cookie or tracking pixel on a client device, such as HTML code or an HTML code snippet that tracks browser data and other device data. If this request or attempt is detected on client device 110 (e.g., by tracking agent 120), then at step 304, placement of this code may be prevented on the device until negotiation and completion of a payment may be performed by the service provider or online entity attempting the payment to an account used by the device for data tracking payments. Thus, the device may refuse to allow the online entity to place device-side code that may be used to data tracking on the device while a fee schedule is transmitted to the online entity and a payment is processed and completed. This may be performed by tracking agent 120 on client device 110, in various embodiments.

At step 306, a payment identifier is transmitted by the device to the service provider or other online entity. Tracking agent 120 on client device 110 may provide this identifier to external service provider 130 over network 150 such that external service provider 130 may then negotiate a rate or fee for placement of the web cookie or tracking pixel on client device 110. This payment identifier may correspond to a token or other code that identifies the device (e.g., client device 110) as requiring a payment for data tracking to be implemented on the device by the online entity (e.g., external service provider 130). Further, this payment identifier identifies the account used for payments with the device, and may further designate the fee schedule for data tracking with transaction processor 140. Once received, the online entity may then transmit the payment identifier to a transaction processor. Thus, at step 308, the payment identifier is received from the online entity at the transaction processor. External service provider 130 may submit the payment identifier to transaction processor 140 over network 150 in order to negotiate the payment. Transaction processor 140 may then use the payment identifier for account and fee schedule lookup. Thereafter, the transaction processor transmits a schedule of rate or other fee schedule for allowance of the data tracking on the device to the online entity, at step 310. If the transaction processor determines a fee schedule was previously provided and is still in effect, the transaction processor may not need to transmit the fee schedule but instead transmit data that notes or otherwise identifies the fee schedule to the online entity After receiving or accessing the fee schedule, external service provider 130 may then determine whether a fee should be paid to an account of the user with transaction processor 140. For example, external service provider 130 may utilize the fee schedule to negotiate and determine a rate with the transaction processor. This may include acceptance of one or more rates for data tracking, which may be limited by one or more usage, amount, length, or type parameters. If there is a successful negotiation and acceptance of a rate, then the corresponding fee may be paid to the account of the user with transaction processor 140, and at step 312, the data tracking is allowed on the device based on the rate limits through code placement of the data tracking code or code snippet. Thus, external service provider 130 may be permitted to place a cookie or pixel on client device 110 that allows for data tracking. Thereafter, the device monitors data tracking by the online entity (e.g., using tracking agent 120 on client device 110), and at step 314 renegotiates or ends the data tracking when the limit(s) are met. However, if there previously was a failure to negotiate a rate and fee payment, then at step 316, the data tracking is prevented on the device. Thus, tracking agent 120 may monitor and/or end data tracking on client device 110 during data tracking by data tracker 134 of external service provider 130.

Figure 4:
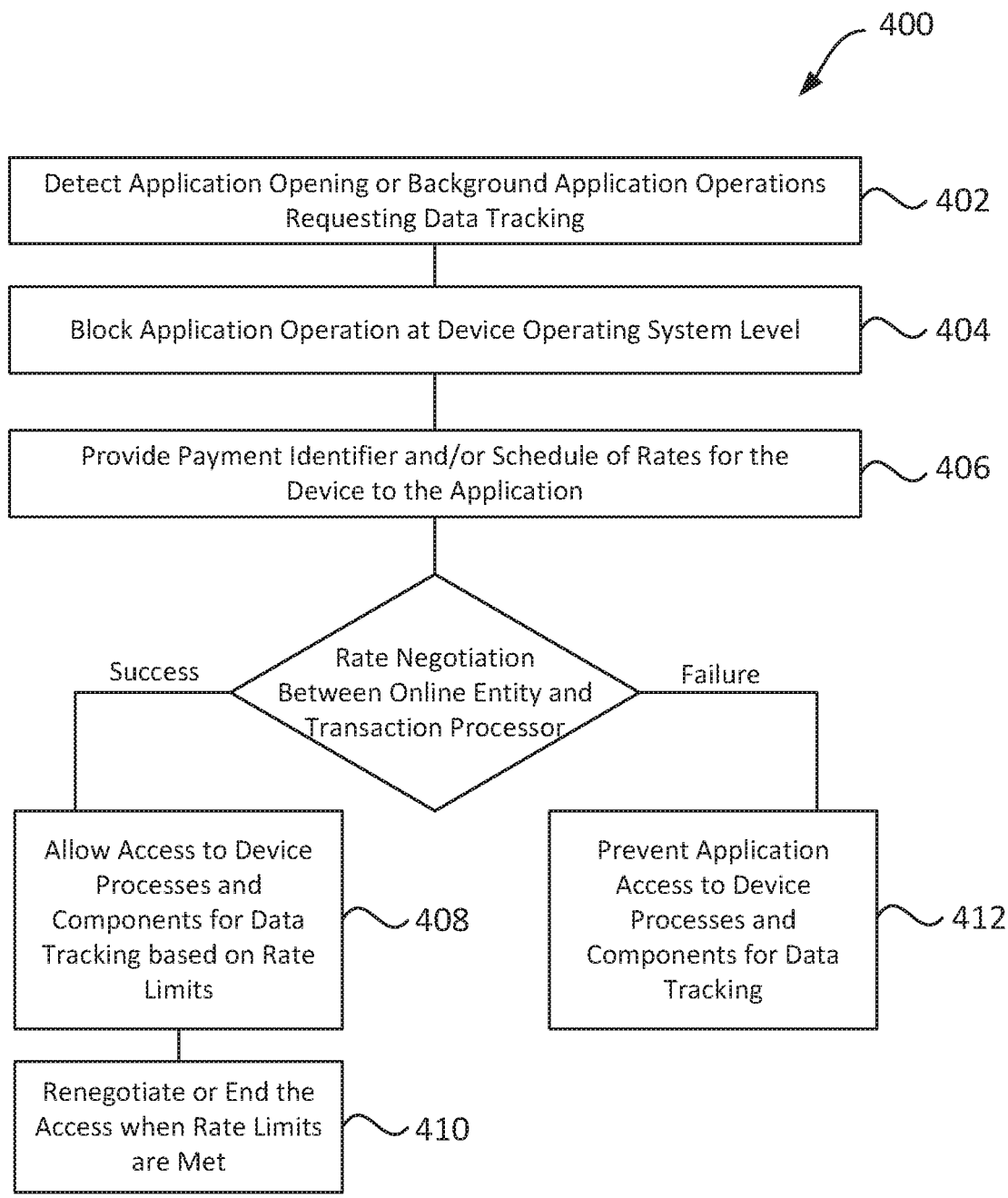
FIG. 4 is a flowchart of an exemplary flowchart for a process for managing data tracking through a native device application, according to an embodiment.

FIG. 4 is a flowchart of an exemplary flowchart for a process for managing data tracking through a native device application, according to an embodiment. Note that one or more steps, processes, and methods described herein of flowchart 400 may be omitted, performed in a different sequence, or combined as desired or appropriate.

Flowchart 400 begins with step 402 where an application opening/execution or background application operations are detected that request data tracking on a device, such as client device 110 in system 100 of FIG. 1. This may be performed by tracking agent 120 on client device 110. For example, an application (e.g., service application 112) may attempt to access stored data or utilize a component or other application to track user and/or device data. The application may further utilize the data tracking to convey the information to an online entity, which allows the online entity to track data and provide targeted advertisements or otherwise monetize the user's data. Once detected by tracking agent 120, the application operations that are attempting to track data are blocked at a device operating system level, at step 404. This may be done while the rate for data tracking is negotiated and until a fee is paid to the user.

Thus, at step 406, a payment identifier and/or schedule of rates with a transaction processor for data tracking on the device is provided to the application. For example, the payment identifier may function similarly to that described in steps 306-310 in flowchart 300 of FIG. 3. However, in other embodiments, the device (e.g., client device 110) may directly provide the schedule of rates to the application or the device may request that a transaction processor provide the schedule of rates to the application and/or online entity directly when detecting the data tracking attempt. Thereafter, the application (e.g., service application 112) and/or online entity (e.g., transaction processor 140) attempts to negotiate a rate and provide a payment to an account of the user, which allows data tracking.

If the payment is made for a negotiated rate, then at step 408, access to device processes and/or components for data tracking is allowed based on rate limits. This may allow data tracking based on one or more parameters that limit the tracking, for example, by amount, length, or type. The device (e.g., client device 110 through tracking agent 120) may continue to monitor the data tracking performed through the application, which may include monitoring the application's data requests and usage of device data and components. Thereafter, at step 410, the data tracking and access to data/components are renegotiated or ended when the limits are met. However, if there previously was a failure to negotiate a rate and fee payment, then at step 412, the data tracking is prevented on the device through the application and the application is prevented from accessing device processes and components used for data tracking. For example, tracking agent 120 of client device 110 may operate to further monitor and/or allow access to service application 112 by data tracker 134 to data tracking service.

Figure 5:
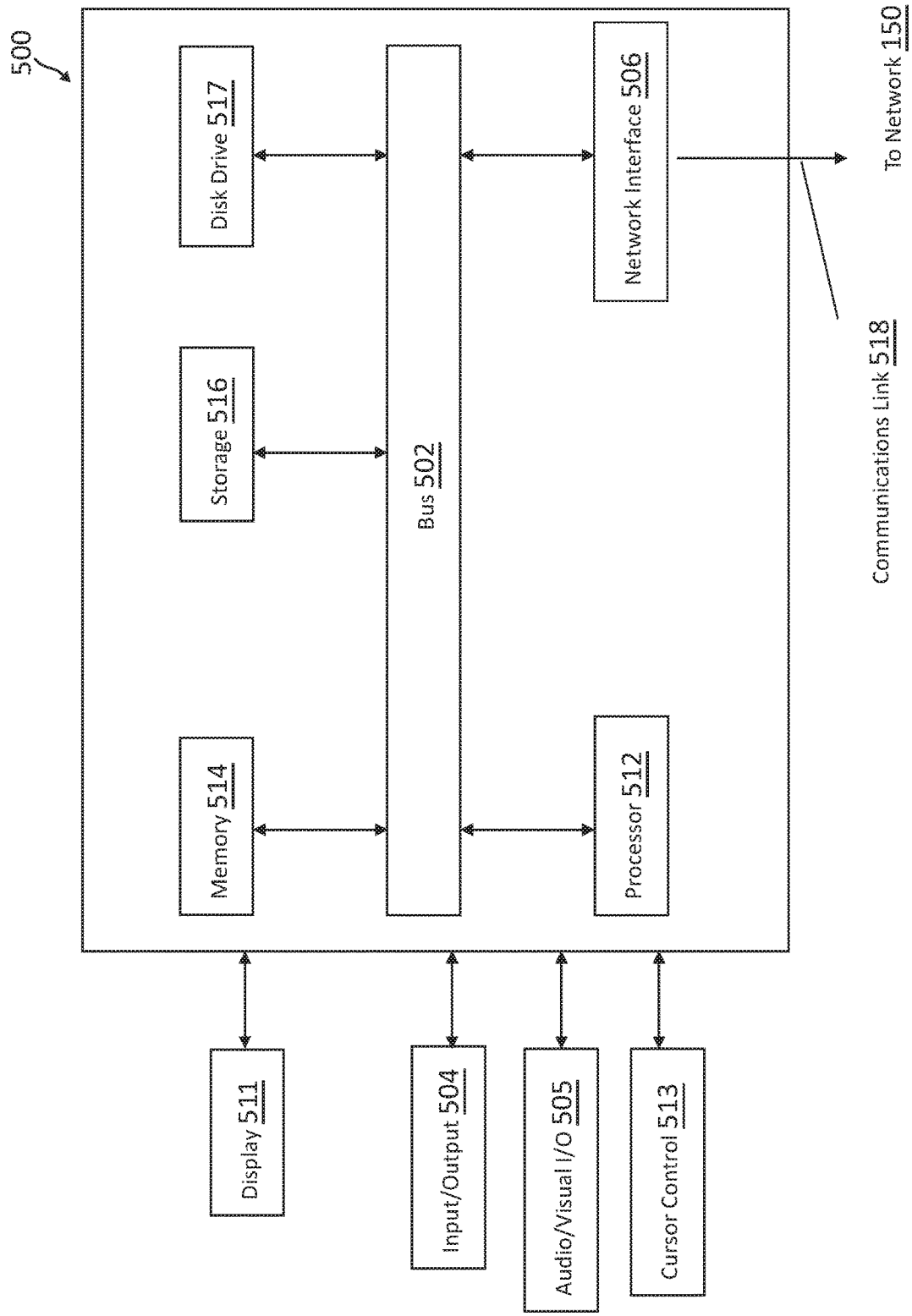
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method performed by a client device comprising a processor and a memory, the method comprising:
    storing, in the memory by the processor, a service application, a tracking agent, a payment identifier of a user, and a fee schedule, wherein the fee schedule is associated with a data tracking limitation;
    activating, by the processor, the tracking agent, wherein the activating comprises logging into the tracking agent by the user;
    accessing, by the service application, a webpage;
    receiving, by the activated tracking agent, a request from the webpage to store a tracking pixel;
    based on the received request, transmitting, by the activated tracking agent, the payment identifier to the webpage;
    receiving, by the activated tracking agent, a payment confirmation identifier from the webpage;
    based on the received payment confirmation identifier, storing, in the memory by the processor, the tracking pixel;
    monitoring, by the activated tracking agent, interactions between the service application and the webpage using the stored tracking pixel based on the data tracking limitation;
    generating, by the activated tracking agent, a toolbar based on the monitoring;
    displaying, in the toolbar by the activated tracking agent, an amount of data tracked based on the monitored interactions;
    determining, by the activated tracking agent, that data tracking is no longer allowed according to the data tracking limitation based on the amount of data tracked and the fee schedule; and
    redirecting, by the activated tracking agent, the service application away from the webpage.

2. The method of claim 1, wherein the tracking pixel comprises a hypertext markup language (HTML) pixel.

3. The method of claim 2, wherein the request includes the tracking pixel and the tracking pixel comprises an HTML pixel, and wherein, before the storing the tracking pixel, the method further comprises:
    determining, by the activated tracking agent, whether a payment from a service provider is completed based on the received payment confirmation identifier.

4. The method of claim 1, further comprising:
    storing, in the memory by the processor, a web browser interface;
    and wherein the receiving the request from the webpage comprises:
    displaying, by the processor, and via the web browser interface, a request for data tracking from the webpage;
    notifying, by the activated tracking agent, the user, via an alert icon with an alert message, that the webpage is requesting data tracking.

5. The method of claim 1, further comprising:
    receiving, by the activated tracking agent, the fee schedule,
    and wherein the transmitting the payment identifier to the webpage comprises:
    transmitting, to the webpage by the activated tracking agent, the fee schedule.

6. The method of claim 1, wherein, before the storing the service application, the tracking agent, the payment identifier, and the fee schedule, the method further comprises
    generating, by the processor, the fee schedule with a service provider, and
    receiving, by the processor, the payment identifier from the service provider based on the generating the fee schedule.

7. The method of claim 1, wherein the accessing the webpage includes detecting, by the processor, the opening of one of the service application or a message associated with the service application.

8. The method of claim 1, wherein the fee schedule includes a fee for the amount of the data tracking.

9. The method of claim 1, wherein the payment confirmation identifier includes a transaction confirmation code, and wherein, before the storing the tracking pixel in the memory, the method further comprises:
    validating, by the processor, the transaction confirmation code confirms a payment associated with the fee schedule.

10. A client device, comprising:
    a processor; and
    a memory storing executable instructions that when executed by the processor cause the processor to perform operations comprising:
    storing, in the memory, a service application, a tracking agent, payment identifier of a user, and a fee schedule, wherein the fee schedule is associated with a data tracking limitation;

activating the tracking agent, wherein the activating comprises logging into the tracking agent by the user;

accessing, via the service application, a webpage;

receiving, via the activated tracking agent, a request from the webpage to store a tracking pixel;

based on the received request, transmitting, via the activated tracking agent, the payment identifier to the webpage;

receiving, via the activated tracking agent, a payment confirmation identifier from the webpage;

based on the received payment confirmation identifier, storing the tracking pixel in the memory;

monitoring, via the activated tracking agent, interactions between the service application and the webpage using the stored tracking pixel based on the data tracking limitation;

generating, via the activated tracking agent, a toolbar based on the monitoring;

displaying, in the toolbar via the activated tracking agent, an amount of data tracked based on the monitored interactions;

determining, via the activated tracking agent, that data tracking is no longer allowed according to the data tracking limitation based on the amount of data tracked and the fee schedule; and redirecting, via the activated tracking agent, the service application away from the webpage.

11. The client device of claim 10, wherein the tracking pixel comprises a hypertext markup language (HTML) pixel.

12. The client device of claim 11, wherein the request includes the tracking pixel and the tracking pixel comprises an HTML pixel, and wherein, before the storing the tracking pixel, the operations further comprise:

determining, via the activated tracking agent, whether a payment from a service provider is completed based on the received payment confirmation identifier.

13. The client device of claim 10, wherein the operations further comprise:

storing a web browser interface in the memory;

and wherein the receiving the request from the webpage comprises:

displaying and via the web browser interface, a request for data tracking from the webpage;

notifying, via the activated tracking agent, the user, via an alert icon with an alert message, that the webpage is requesting data tracking.

14. The client device of claim 10, wherein the operations further comprise:

receiving, via the activated tracking agent, the fee schedule, and wherein the transmitting the payment identifier to the webpage comprises:

transmitting, via the activated tracking agent, the fee schedule to the webpage.

15. The client device of claim 10, wherein, before the storing the service application, the tracking agent, the payment identifier, and the fee schedule, the operations further comprise:

generating the fee schedule with a service provider, and receiving the payment identifier from the service provider based on the generating the fee schedule.

16. The client device of claim 10, wherein the accessing the webpage includes detecting the opening of one of the service application or a message associated with the service application.

17. The client device of claim 10, wherein the fee schedule includes a fee for the amount of the data tracking.

18. The client device of claim 10, wherein the payment confirmation identifier includes a transaction confirmation code, and wherein, before the storing the tracking pixel in the memory, the operations further comprise:

validating the transaction confirmation code confirms a payment associated with the fee schedule.

19. A non-transitory machine-readable medium having stored thereon machine-readable instructions executable that when executed by a processor cause the processor to perform operations comprising:

storing, in a memory, a service application, a tracking agent, a payment identifier of a user, and a fee schedule, wherein the fee schedule is associated with a data tracking limitation;

activating, the tracking agent, wherein the activating comprises logging into the tracking agent by the user;

accessing, via the service application, a webpage;

receiving, via the activated tracking agent, a request from the webpage to store a tracking pixel;

based on the received request, transmitting, via the activated tracking agent, the payment identifier to the webpage;

receiving, via the activated tracking agent, a payment confirmation identifier from the webpage;

based on the received payment confirmation identifier, storing, in the memory, the tracking pixel;

monitoring, via the activated tracking agent, interactions between the service application and the webpage using the stored tracking pixel based on the data tracking limitation;

generating, via the activated tracking agent, a toolbar based on the monitoring;

displaying, in the toolbar via the activated tracking agent, an amount of data tracked based on the monitored interactions;

determining, via the activated tracking agent, that data tracking is no longer allowed according to the data tracking limitation based on the amount of data tracked and the fee schedule; and redirecting, via the activated tracking agent, the service application away from the webpage.

20. The non-transitory machine-readable medium of claim 19, wherein the tracking pixel comprises a hypertext markup language (HTML) pixel.

* * * * *